United States Patent [19]

Bengtsson et al.

[11] Patent Number: 4,800,073

[45] Date of Patent: Jan. 24, 1989

[54] PROCESS FOR THE PRODUCTION OF HYDROGEN PEROXIDE

[75] Inventors: Erik Bengtsson, Surte; Ulf Andersson, Gothenburg, both of Sweden

[73] Assignee: EKA Nobel AB, Surte, Sweden

[21] Appl. No.: 171,106

[22] Filed: Mar. 21, 1988

[51] Int. Cl.$^4$ ............................................. C01B 15/02
[52] U.S. Cl. ................................................. 423/588
[58] Field of Search ....................................... 423/588

[56] References Cited

U.S. PATENT DOCUMENTS

| | | | |
|---|---|---|---|
| 3,767,778 | 10/1973 | Giesselmann et al. | 423/588 |
| 4,046,868 | 9/1977 | Vaughan | 423/588 |
| 4,349,526 | 9/1982 | Goor et al. | 423/588 |
| 4,394,369 | 7/1983 | Ranbom | 423/588 |
| 4,428,923 | 1/1984 | Kunkel et al. | 423/588 |

FOREIGN PATENT DOCUMENTS

| | | | |
|---|---|---|---|
| 2532819 | of 0000 | Fed. Rep. of Germany. | |
| 2018686 | 10/1971 | Fed. Rep. of Germany | 423/588 |
| 44480 | of 0000 | Sweden. | |

*Primary Examiner*—John Doll
*Assistant Examiner*—Wayne A. Langel
*Attorney, Agent, or Firm*—Fred Philpitt

[57] ABSTRACT

A process for the production of hydrogen peroxide according to the anthraquinone process. According to the process certain alkyl substituted caprolactames are used as solvents, and particularly as solvents for anthrahydroquinones. The substituted caprolactames, which for example can be hexyl caprolactam and octyl caprolactam, give a very good solubility for anthrahydroquinones and also for anthraquinones. The compounds can be used as the sole solvent at the production of hydrogen peroxide or in combination with conventionally used solvents such as hydrocarbons.

4 Claims, No Drawings

PROCESS FOR THE PRODUCTION OF HYDROGEN PEROXIDE

The present invention relates to the production of hydrogen peroxide according to the per se well known anthraquinone process. More particularly the invention relates to the production of hydrogen peroxide according to the anthraquinone process using particular solvents which give very good solubility for anthrahydroquinones and also for anthraquinones. The solvents used according to the present invention are certain alkyl substituted caprolactames.

In the production of hydrogen peroxide according to known so-called anthraquinone processes alkyl- or alkenyl-substituted anthraquinones and/or tetrahydroanthraquinones are hydrogenated to the corresponding anthrahydroquinones in a solvent in the presence of a catalyst. After separation of the catalyst the hydroquinones are oxidized by means of air or oxygen and hereby hydrogen peroxide is obtained and the original anthraquinones are regenerated. The hydrogen peroxide is removed, eg by extraction, and the anthraquinones are recycled to the hydrogenation step. The extracted hydrogen peroxide is usually destilled to obtain higher concentrations.

In the anthraquinone process a combination of two different types of solvents is usually used and of these one should be capable of dissolving high amounts of anthraquinone while the other should dissolve high amounts of anthrahydroquinone. As solvents for anthraquinones hydrocarbons, aromatic, aliphatic or naphtenic hydrocarbons, or mixtures of these, are usually used. As solvents for anthrahydroquinones polar solvents or compounds are used and well known such solvents or compounds are aliphatic alcohols, usually with 5 to 12 carbon atoms, eg 2-octanol and diisobutylcarbinol, and phosphoric acid esters such as trioctyl phosphate. Certain nitrogen cntaining compounds are also known as solvents in the anthraquinone process and particularly as solvents for the hydroquinones. U.S. Pat. No. 4046868 discloses the use of carboxylic acid amides in which the nitrogen is substituted with alkyl groups as solvents in the anthraquinone process. The German patent application No. 2018686 discloses symmetrically or asymmetrically alkyl or arylsubstituted urea as solvent. U.S. Pat. No. 4394369 discloses the use of alkyl-substituted pyrolidone as solvent.

According to the present invention it has been found that certain alkyl substituted caprolaktames, which are characteristic in that they contain the group

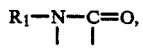

wherein both the carbon and the nitrogen form part of a cyclic structure and wherein $R_1$ is an alkyl group, are excellent solvents for anthraquinones and also for anthraquinones. Compared with previously known types of nitrogen containing solvents for this purpose, eg tetraalkyl substituted urea and N-alkyl substituted pyrrolidone, an equal or better hydroquinone solubility and quinone solubility is obtained together with a substantial improvement of the distribution coefficient for hydrogen peroxide between the water phase and the solvent phase. It is of great advantage that the distribution coefficient for hydrogen peroxide between water and solvent mixture is so high that water solutions of high concentration can be obtained, but not high enough to cause the appearance of explosive emulsions together with the organic solvents. Further the solvents in accordance with the invention have low miscibility with water, which is very important with regard to the purity of the hydrogen peroxide extract and the consumption of solvent. The compounds further have a suitable low viscosity and high boiling point for use in the production of hydrogen peroxide.

The present invention thus relates to a process for the production of hydrogen peroxide by reduction and oxidation of an anthraquinone wherein as solvent is used a compound having the general formula

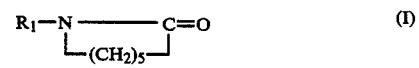

wherein $R_1$ is an alkyl group having 6 to 12 carbon atoms.

Thus the intended compounds are N-alkyl substituted caprolactames.

As the compounds are used as solvents in a hydrogenation process they must of course not themselves contain unsaturations. $R_1$ is an alkyl group having from 6 to 12 carbon atoms. With increasing carbon chain length for $R_1$ the lipophilic properties of the compounds increase, which results in a decreased water miscibility. However, if the compounds have too high lipophilic properties the anthrahydroquinone solubility decreases and it also results in a higher viscosity and because of this $R_1$ suitably contains 6 to 8 carbon atoms. A certain water solubility of the compounds can be allowed, but it should not exceed 1% by weight. The compounds have low vapour pressures and hereby it is simple to obtain a condensate, which can be used for washing the obtained hydrogen peroxide. As examples of specific suitable compounds can be mentioned hexyl caprolactam and octyl caprolactam.

Most of the compounds of the type, which according to the present invention are used as solvents at the production of hydrogen peroxide, are per se previously known and available. Compounds of the type N-alkyl-caprolactam can be prepared e.g. by starting from a mixture of dioxane, caprolactam and sodium hydride, to which is added an alkyl iodide, followed by reflux heating of the reaction mixture. After filtration the solvent is evaporated and vacuum distillation of the residue gives the desired N-alkyl-caprolactam.

In the present process for the production of hydrogen peroxide according to the anthraquinone process any anthraquinone starting material can be used. The terms anthraquinone and quinone are herein used for the per se well known anthraquinones with aliphatic substituents and the hydroanthraquinones such as the tetrahydro derivatives of these. As examples of anthraquinones and anthrahydroquinones can be mentioned 2-ethylanthraquinone, 2-t-butyl-anthraquinone, 2-amylanthraquinone, 2-hexenylanthraquinone and their tetrahydro derivatives. The terms anthraquinones and quinones are also used to comprise carbonic acid esters and sulphonic acid esters and other anthraquinone derivatives per se known as reaction carriers. It is particularly advantageous that the compounds according to the invention have a very good solubility for the anthraquinones which for economical reasons are preferred in the hydrogen peroxide production, namely 2-ethylanthraquinone and 2-ethyl-5,6,7,8-tetrahydroanthraquinone, as their use has earlier been limited to a certain extent due to a comparatively low solubility in the most commonly used solvents.

The alkylsubstituted caprolactames can according to the invention be used as the sole solvent as they have both good anthraquinone solubility and anthrahydroquinone solubility. From economical reasons it is, however, suitable to use them primarily as solvents for anthrahydroquinones and thus in combination with conventional solvents for anthraquinones, such as aromatic, aliphatic and naphtenic hydrocarbons. In combination with these solvents the compounds of the invention give a substantially improved hydroquinone solubility at substantially higher ratios of hydrocarbon solvent to hydroquinone solvent, for example compared with the known combination of hydrocarbon solvent and diisobutylcarbinol. For mixtures with hydrocarbon solvents the volume ratio between this and the present alkyl substituted caprolactames is preferably within the range of from 100:1 to 1:1, preferably from 100:1 to 2:1. If desired, the compounds can of course also be used in combination with known compounds, such as phosphoric acid esters, diisobutylcarbinol, aliphatic alcohols etc, which are primarily used as anthrahydroquinone solvents.

The invention is further illustrated in the following examples, which, however, are not intended to limit the invention. Parts and percent relate to parts by volume and percent by volume respectively, unless otherwise stated.

EXAMPLE 1

In this example hydrogen peroxide was produced using a combination of 75% Shellsol AB (registered trademark for a solvent consisting essentially of $C_4$ alkylbenzene derivatives) and 25% octyl caprolactam as solvent. The procedure was carried out as follows:

180 g/l of tetrahydroethylanthraquinone were dissolved in the solvent mixture. Raney nickel was added to a concentration of 28 g/l. Hydrogen gas was introduced and the tetrahydroethylanthraquinone was hydrogenated to about 90%. The nickel catalyst was then removed and the hydrogenated solution oxidized with air. The solvent mixture was analyzed and the hydrogen peroxide content was found to be 21,8 g/l. The hydrogen peroxide was extracted with water and the working solution free from hydrogen peroxide can, after drying, be recycled to the hydrogenation step.

The example shows that a very high amount of tetrahydroanthrahydroquinone could be dissolved in the solvent according to the invention and thus the hydrogen peroxide concentration in the oxidizing solution was very high.

EXAMPLE 2

The solubility of 2-ethylanthraquinone (2-EAQ) and of 2-ethyltetrahydroanthrahydroquinone (2-THEAHQ) was measured in mixtures of 75% Shellsol AB and 25% of two compounds according to the invention.

The solubility of the hydroquinones in the following systems was investigated:
1. Shellsol+Hexyl caprolactam (HK)
2. Shellsol+Octyl caprolactam (OK)

As a comparison the solubility of the hydroquinones was also investigated in the following known solvent combinations:

3. Shellsol (75%)+Diethyl dibutylurea (DEDBU) (25%)
4. Shellsol (75%)+Tricotyl phosphate (TOF) (25%)
4. Shellsol (75%)+Octyl pyrrolidone (OP) (25%)
6. Shellsol (50%)+Diisobutylcarbinol (Nonanol) (50%)

The results are shown in Table I. The solubility for 2-EAQ is shown as the solubility of this in the pure hydroquinone solvent at a temperature of 20° C. while the solubility of 2-THEAHQ is shown at a temperature of 42° C.

TABLE I

| Solvent combination | Solubility of 2-EAQ g/l | Solubility of 2-THEAHQ g/l |
| --- | --- | --- |
| 1 | 79 | 139 |
| 2 | 96 | 122 |
| 3 (comparison) | 68 | 110 |
| 4 (comparison) | 35 | 72 |
| 5 (comparison) | 112 | 128* |
| 6 (comparison) | <30 | 50 |

*This value is taken from EP-A 95822, example 2, and has been recalculated to solubility for hydroquinone. The measurement is made at 50° C., and the value obtained is thus higher than it would have been at 42° C.

As evident from the table the compounds according to the invention are equal or better solvents for hydroquinone as previously known nitrogen containing solvents for the hydrogen peroxide process. As is shown in example 3 below the compounds according to the invention also have a number of other favourable properties. To find a good solvent for hydroquinone for the hydrogen peroxide process means not only the consideration of the solubility of anthraquinone and hydroquinone but also the consideration of a number of other properties to obtain an optimal summary result. Some significant parameters are shown in table II below. The viscosity given was measured with a Brookfield viscosimeter.

TABLE II

| Compound | Density at 20° C. | Viscosity 20° C. | Boiling point 760 mm Hg | Solubility in H₂O w. % |
| --- | --- | --- | --- | --- |
| HK | 0,927 | 15 cp | about 330° C. | 0,2 |
| OK | 0,917 | 25 cp | about 350° C. | 0,0004 |
| OP | 0,925 | — | — | 0,007 |

Tabell II shows good values for some essential properties for solvents of hydroquinone for the hydrogen peroxide process.

Thus a low density (as far below 1 as possible) facilitates the extraction with water as a quicker phase separation is obtained with a lower density.

Besides a low viscosity gives a higher efficiency to the extraction as the medium is more liquid.

A high boiling point gives reduced evaporation of the solvent and thus a reduction of solvent loss and a reduction of pollution in the oxidation step and the drying step, at which air is blown through the reaction mixture.

A low water solubility for the solvent is considered to be a very important property in this application as this brings both a cleaner $H_2O_2$-solution and reduced loss of solvent.

EXAMPLE 3

The distribution coefficient for hydrogen peroxide between water phase and different solvent phase according to example 1 was determined by shaking water solutions of hydrogen peroxide with the different solvent combinations until equilibrium was obtained. Then the amount of hydrogen peroxide was determined in the two phases.

The distribution coefficient (=amount of hydrogen peroxide in the water phase/amount of hydrogen peroxide in the solvent phase) is shown in table 3, column 3.

The first column of the table shows the maximum amount of hydrogen peroxide obtained in the solvent combination at the oxidation of a saturated hydroquinone solution.

The second column of the table shows the equilibrium amount in the water phase at the above mentioned maximum amount in the solvent phase.

Finally the amount of TOC (=Total Oxidizable Carbon) was determined in those water phases, which have been brought into equilibrium with the solvent combinations. The results appear from the last column of the table.

TABLE III

| Solvent combination | Amount of H₂O₂ in the oxidized quinone solution g/l | Amount of H₂O₂ in the water phase g/l | Distribution coefficient | Amount of TOC in water mg/l |
|---|---|---|---|---|
| 1 | 19,7 | 512 | 26 | 400 |
| 2 | 17,1 | 480 | 28 | 200 |
| 3 (comp.) | 15,6 | 935 | 60 | 350 |
| 4 (comp.) | 10,2 | 816 | 80 | 180 |
| 5 (comp.) | 18,1 | 325 | 18 | 330 |
| 6 (comp.) | 7 | 462 | 66 | 300 |

The table shows that the hydroquinone solvents according to the invention gives high concentrations of the extracted hydrogen peroxide in the water phase. Thus a possible further concentration of this hydrogen peroxide solution at a subsequent destillation can be effected with a low contribution of energy or can be avoided. The amount of hydrogen peroxide must not be so high that the emulsions formed at the extraction becomes explosive. The limit for explosion is at a concentration of about 600 g/l (c.f. SE-A 411 745 and 418 489).

Besides it appears from the table that the distribution coefficient between water phase and solvent phase is considerably better for the two solvents according to the invention in comparison with the distribution coefficient for the closest of the known solvents. This implies that water solutions with a higher hydrogen peroxide concentration can be obtained and thus lower amounts of remaining peroxide in the solvent phase.

Further it appears from the table that water solutions of hydrogen peroxide, obtained by solvents according to the invention, contain low amounts of organic impurities in the form of solvent residues. This condition implies several advantages:
 1. Solvent losses during the process are low.
 2. Distillation can be effected without risk for formation of explosive mixtures with organic solvents.
 3. Product quality is good.

In particular a comparison between the closest of the known solvents, combination 5, with solvent combination 2 shows that considerably higher amounts of hydrogen peroxide in the water phase are obtained (480 g/l and 325 g/l respectively). Besides the amount of dissolved organic impurities is considerably lower (200 mg/l and 330 mg/l respectively).

We claim:
 1. A process for the production of hydrogen peroxide by reduction and oxidation of an anthraquinone, characterized in that as solvent is used an alkyl substituted caprolaktam having the general formula

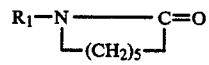

wherein $R_1$ is an alkyl group having from 6 to 12 carbon atoms.
 2. A process according to claim 1, characterized in that $R_1$ is an octyl group.
 3. A process according to claim 1, characterized in that the alkyl substituted caprolactam is used in combination with a hydrocarbon solvent.
 4. A process according to claim 1, characterized in that the alkyl substituted caprolactam is used in combination with per se known polar solvents.

* * * * *